Figure 4:
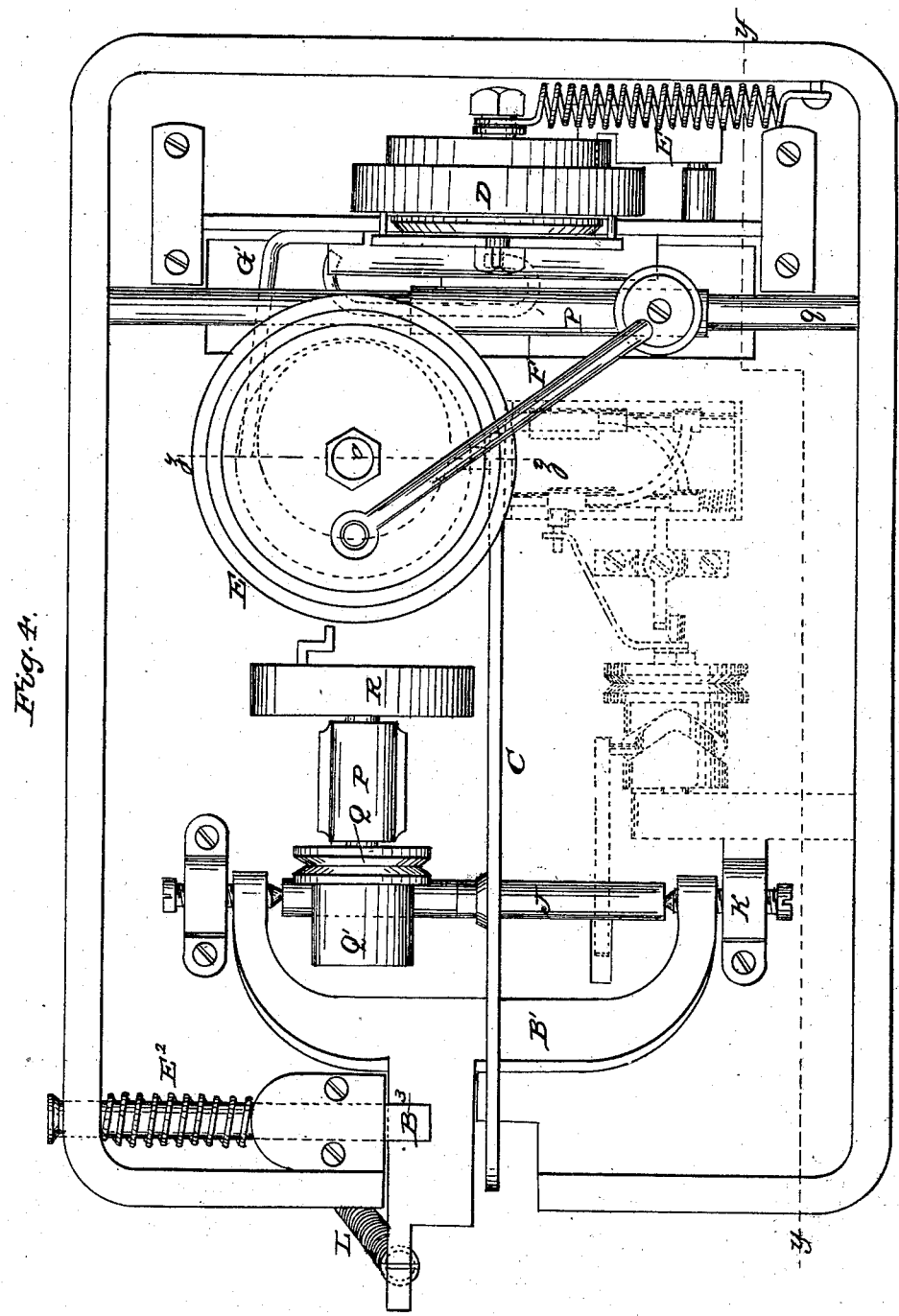

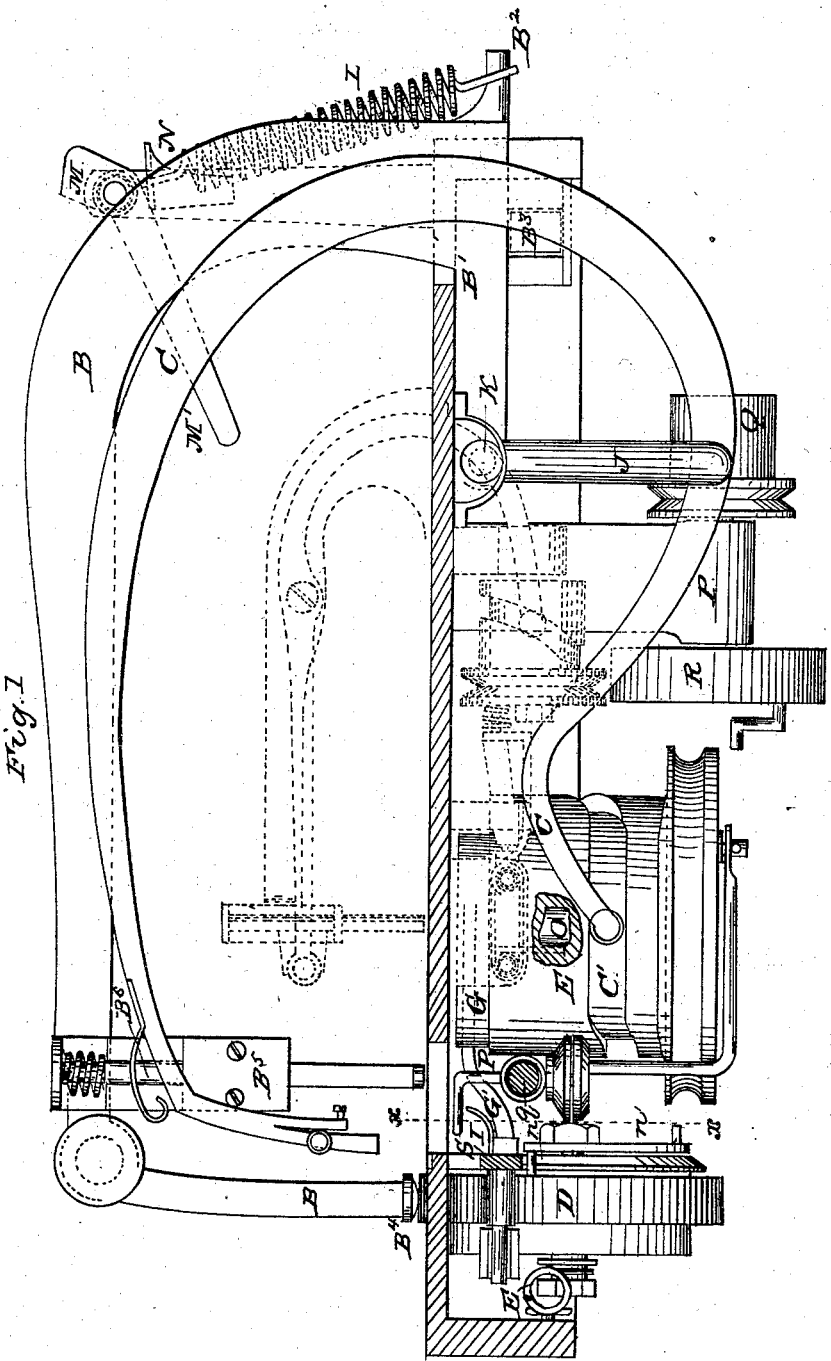

T. L. MELONE.
Sewing Machine.
No. 54,577.
3 Sheets—Sheet 2.
Patented May 8, 1866.
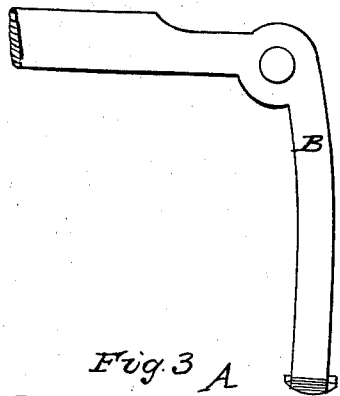
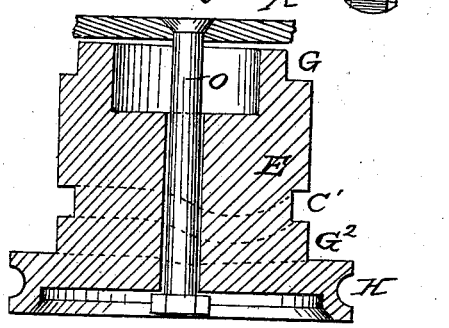
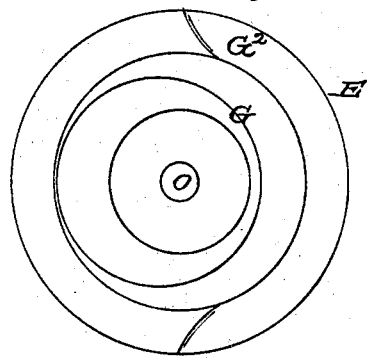
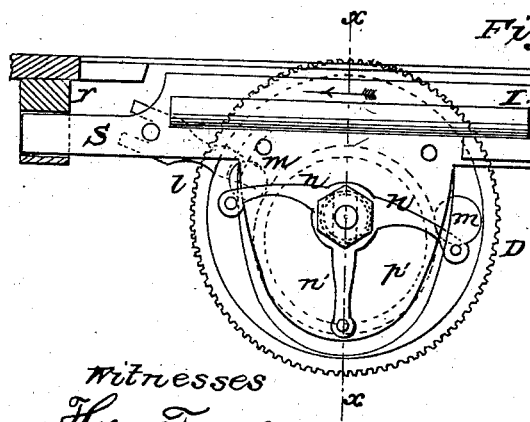
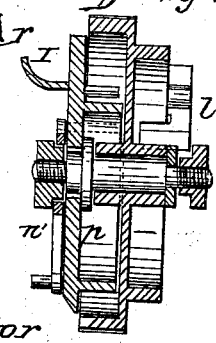

T. L. MELONE.
Sewing Machine.

No. 54,577.

3 Sheets—Sheet 3.

Patented May 8, 1866.

Witnesses
Theo Teesch
Wm Greinn

Inventor
T. L. Melone
By Munn & Co Attys

UNITED STATES PATENT OFFICE.

T. L. MELONE, OF GRANVILLE, OHIO.

IMPROVEMENT IN SEWING-MACHINES.

Specification forming part of Letters Patent No. 54,577, dated May 8, 1866.

*To all whom it may concern:*

Be it known that I, T. L. MELONE, of Granville, in the county of Licking and State of Ohio, have invented a new and useful Improvement in Sewing-Machines; and I do hereby declare that the following is a full, clear, and exact description thereof, which will enable those skilled in the art to make and use the same, reference being had to the accompanying drawing, forming part of this specification, in which—

Figure 1, Sheet No. 1, is a vertical longitudinal section of a sewing-machine containing my improvements, taken on the line $y$ of Fig. 4. Fig. 2 shows part of the presser-arm. Fig. 3 is an axial section on the line $z$, Fig. 4, of the cam-shaft E. Fig. 4, Sheet No. 2, is an inverted plan view of the sewing-machine. Fig. 5 is a plan view of the cam-shaft E, supposing the table to be removed. Fig. 6, Sheet 3, is a section taken on the line $x$ of Fig. 1, showing the feeding device and a part of the shuttle-race in elevation. Fig. 7 is a cross-section of the feeding device, taken on the line $x'$ of Fig. 6.

Similar letters of reference indicate like parts.

The principal object of this invention is to simplify and reduce the cost of the shuttle sewing-machine.

It consists, among other things, of a novel construction of the presser-arm and a novel mode of supporting it in its proper position; also, in making the presser-bar movable about a center placed at the lower end of the said bar, so that the work can be released by moving the bar about its center of motion; also, in giving to the presser-bar and needle-lever a common fulcrum and point of support; also, among other things, in a new mode of effecting the feed of the material.

A is the cloth-bed of the machine, on which the material to be operated on is placed. Below this bed the driving-shaft is placed, and said shaft may be in a vertical or in a horizontal position, an example of each position being here given under the same bed, the horizontal being seen in red outline in Fig. 4.

E is a vertical cam-shaft sustained beneath the bed, from which it is suspended by means of an axle, O, whose upper end is fixed to the bed. On this cam-shaft are placed a band-wheel, H, a needle-operating cam, C', and a feed-cam, G, all so close together that they may be combined in a single casting, and to the under end of the shaft is secured a crank-pin, which operates the bent shuttle-driving arm F.

The inner face of the flange of the cam-shaft, on which the band-wheel H is formed, has a cam, $G^2$, formed on it, which gives motion through a suitable lever (not here shown) to the feeding device, such lever being attached to the lower part of the arm $n'$.

The needle-lever C is cast in one piece and has its fulcrum in bearings or lugs K beneath the cloth-bed. The journals of the needle-lever are at the ends of the curved arm J, which is joined to the needle-lever at the middle of its length, which is also the point of its greatest convexity. That part of the said curved arm J which is above the cam-wheel Q' is bent upward toward the cloth-bed to make room for that wheel. The journals of the needle-arm C pass through the ends of the circular part B' of the presser-foot arm B. The lever C and the arm B B' are therefore supported from the same lugs or bearings, and have their motions about the same center. Each of them also is formed of a single casting. The bent part B' extends from the base of the upper part of the arm B at right angles, and lies close up to the under side of the bed, to which it is held by a bolt, $B^3$, kept protruded beneath the part B' by a spring, $E^2$.

N is a standard rising from the back part of the cloth-bed alongside of the presser-arm. It carries at top a cam, M, operated by an arm, M', the said cam being formed of a plate on the end of a collar or ferrule, which is capable of rotation on a pin projecting from the inside of the standard. A spiral spring, L, extending from the top of said standard to a finger, $B^2$, which projects from the bottom of the presser-arm B, serves to hold the part B' of the presser-arm well up to the under side of the bed when the bolt $B^3$ is withdrawn from beneath said part B', and to keep the presser-foot down upon the cloth, the presser-foot being raised when desired by means of the cam M.

When it is desired to turn the presser-arm up about its fulcrum the bolt $B^3$ is pulled from beneath it, and when the said arm is brought down toward the cloth-bed again the spring $B^2$ will force the bolt in place again, so as to lock it, as before.

The presser-arm carries a foot at its forward end, which foot comes down over the feed-wheel D and serves to hold the cloth which is being sewed down upon the wheel.

When the cloth is to be released the operator raises the arm M', so as to bring the cam M down upon a bearing-plate, N, fixed to the side of the arm, and thereby force it downward and cause it to vibrate about its fulcra at K K, and so raise the foot B⁴ from off the cloth.

The feeding devices and the shuttle-race are connected to each other, so that they move together back and forth horizontally. The necessary horizontal movements are given to the feed from the cam G through the arm G', which is made fast to the sliding bar $s$, that carries the feeding device and the race, and whose ends slide in boxes $p$ $p$. A plate, $p'$, hanging down from the bar $s$, serves to support the feeding-wheel D by means of an axle which passes through the hub of the wheel. To the outer end of said axle is fastened one end of a spiral spring, E', whose other end is fastened to the bed of the machine. The office of this spring is to bring back the feeding device after each forward movement. This part of my invention consists, essentially, in a novel mode of feeding the material. The wheel takes the place of the usual feeding-dog in what is known as the "four-motion feed," but it is not necessary to give it the up-and-down or vertical motions. The wheel is locked and kept from revolving during its advance by means of one of the balls $m$ and arms $n$, the latter having pins which project into the space left between the periphery of the wheel and the sides of that part of the plate $p'$ which is inclosed within the rim of the wheel. Therefore, when the raceway is moved forward the wheel moves forward with it, its serrated edge griping the material and moving it beneath the foot of the presser. When the force which takes the race and the wheel forward is removed they are brought back by the spring E', during which movement the wheel, not being locked by the balls, will revolve or roll over or against the material, and so will not exert any force to draw it back. When the feed is to be reversed the locking device is to be reversed by holding up the ball which locked the wheel and allowing the other ball to take a proper position to lock the wheel in the reverse direction.

The plate $p'$, which hangs down from the shuttle-race and supports the feed-wheel, is slotted vertically to allow the wheel to be set and adjusted at a suitable distance above the top of the cloth-bed.

The needle-lever C may be driven and the feed and shuttle driver be operated by a horizontal cam-shaft instead of the vertical cam-shaft. In order to carry out such an arrangement, I provide a hanging bearing, P, through which an axle is carried to support a cam-shaft, Q', to one end of which is fixed a band-wheel. On the opposite end of the axle I place a balance-wheel, R, which carries a crank for driving the feeding device.

If a groove like the groove C' is made in the cam-shaft Q' and a pin from the curved arm J of the needle-lever C be projected into such groove, it is evident that the said needle-lever will be moved in the same manner as if it were acted upon by the cam-groove C'.

A modification (lettered B⁶) of the presser-foot is attached to the presser-bar by means of a guiding-frame, B⁵, in which its shank slides. A short spiral spring is arranged around the upper part of its shank at the top of the frame B⁵ to keep the foot down on the cloth-bed.

The presser-bar is made at a greatly reduced cost by casting it in one piece, and by giving to its part B' the form here shown I am enabled to support the said presser-bar and also the needle-lever by the same means or devices, the means shown in this example being screws which pass through the lugs K K and carry the ends of the part B' of the presser-bar, and also the ends of the arch J of the needle-lever, thereby giving them a common fulcrum.

I claim as new and desire to secure by Letters Patent—

1. The cam-shaft E, placed vertically beneath the bed of the machine, with its cams G and C' and its band-wheel H and its crank for operating the connecting-rod F, which drives the reciprocating shuttle, all substantially as described.

2. Locking the presser-bar to its proper position for work by means of the spring-bolt B³, constructed and applied substantially as described.

3. Feeding the material in sewing-machines by means of a feed-wheel working on a slide beneath the cloth-bed and having reciprocating motion in horizontal directions, the same being locked so as not to rotate when it is moved forward to give the feed, but being allowed to rotate so as not to carry the cloth back when it is returned to its former position, substantially as described.

T. L. MELONE.

Witnesses:
DAVID PARTRIDGE,
ANDR. J. POWELL.